United States Patent [19]

Geiger

[11] 3,829,682

[45]* Aug. 13, 1974

[54] PULSE CODED RAILWAY SIGNAL SYSTEM

[75] Inventor: Willard L. Geiger, Chagrin Falls, Ohio

[73] Assignee: Erico Products, Inc., Solon, Ohio

[ * ] Notice: The portion of the term of this patent subsequent to June 19, 1990, has been disclaimed.

[22] Filed: Feb. 20, 1973

[21] Appl. No.: 333,671

Related U.S. Application Data

[63] Continuation-in-part of Ser. No. 105,509, Jan. 11, 1971, Pat. No. 3,740,550.

[52] U.S. Cl. .................................. 246/125, 246/40
[51] Int. Cl. .............................................. B61l 29/32
[58] Field of Search ................... 246/40, 125, 130 R

[56] References Cited

UNITED STATES PATENTS 3,069,542 12/1962 Failor ............................ 246/130 R
3,740,550 6/1973 Geiger ............................... 246/125

*Primary Examiner*—M. Henson Wood, Jr.
*Assistant Examiner*—George H. Libman
*Attorney, Agent, or Firm*—Donnelly, Maky, Renner & Otto

[57] ABSTRACT

A railway signalling system using coded digital signals impressed on the tracks for direct or computer directed block signal control, the presence of a train on a track section causing shunting of the signals and an indication from a receiver which operates in a fail-safe configuration. in each signal circuit first and second tone oscillators provide carrier signals which are modulated in a specific digital pattern and applied to the tracks. A tone sensitive receiver separately detects the carrier signals and provides pulse train outputs which are decoded in a binary counter and coincidence gate circuit for ascertainment that the correct digital code pattern has been received. Signals are developed for energization of an oscillator, the output of the latter being amplified for direct or computer directed block signal control. More than one signal circuit can be employed on common tracks for separate or overlapping signal control by the selection of different pairs of operating frequencies, readily accommodated by plug-in filter substitution.

12 Claims, 7 Drawing Figures

PATENTED AUG 13 1974 3,829,682

SHEET 3 OF 4

PULSE CODED RAILWAY SIGNAL SYSTEM

This application is a continuation-in-part of my copending application Ser. No. 105,509 filed Jan. 11, 1971 now U.S. Pat. No. 3,740,550.

BACKGROUND OF THE INVENTION

This invention relates to signalling systems and more particularly to a pulse coded transmitter and receiving system for effecting track and train block signal control.

Many different forms of signalling systems have been devised fo protection of track sections, most relying on the presence of a train at the section location for shunting of a signal impressed on the railroad tracks or for the completion of an electrical circuit through the tracks for control of an immediately preceding track section. Most of the systems presently available have significant limitations, the DC system being limited in the number of signalling circuits possible on common tracks which is disadvantageous where multiple track sections are encountered or where plural signals are desired. The impressed AC signal systems similarly have been found not highly reliable in that extraneously introduced signals caused by strong magnetic fields of electric trains, natural occurrences and the like may cause false indications in the signal circuit. Reliability is a chief design parameter for railway signalling systems and more exotic systems which are designed to obviate the effects of randomly introduced noise and the like must also be considered from the standpoint of an extremely high degree of assured operation together with a requirement for minimal maintenance procedures.

The apparatus of the instant invention is especially advantageous in the utilization of highly reliable integrated circuit and semi-conductor components together with a mode of operation which is almost impossible to fault by the introduction of extraneous signals or by internal failure of the circuitry itself. In this regard, an island of sensitivity for control of a track section is determined by the connections of transmitter and receiver units to the track circuit and if desired, plural systems of this type may be utilized on common track circuits for overlapping protection or for control over different specified ranges of the track.

The signalling system essentially comprises apparatus for generating a digital signal, cyclically repeated in a specific code pattern and transmitted through the measurement range by conduction through the track circuit. Two audio tones are utilized as the carriers for transmission of the digital signals, being modulated in specific code pattern which is developed in a binary counter and gate encoder energized from a low frequency indpendent oscillator source.

At the receiver location the digital signals are independently monitored in a dual channel receiver, demodulated to a pulse train format and recombined for application to decoding circuitry. In the decoder the recombined pulse train is utilized to drive a binary counter and a synchronizing pulse common to both channels of digital information is separated for checking the time of receipt of same in relation to the specific code pattern generated at the transmitter. Resulting digital signals are utilized for direct energization of a unique relay driver amplifier which maintains energization of a railway signal relay and provides time delay intervals for accommodation of transient fault signals. Alternatively the digital signals may be applied to a computer which controls track traffic. The digital signals are utilized to develop biasing and gating potentials, for example in the former case, for operation of an oscillator in the relay driver circuit.

SUMMARY OF THE INVENTION

It is therefore one object of this invention to provide an improved railway signalling system which is fail-safe in operation and is more reliable than previously known systems.

It is another object of this invention to provide an improved railway signalling system which operates on a digital signal basis and which is highly insensitive to extraneously introduced signals.

It is yet another object of this invention to provide an improved railway signalling system which monitors the track continuity as a part of the system and operates in a fail-safe condition upon fault anywhere within the system.

It is yet another object of this invention to provide a unique form of relay driver amplifier circuit for energizing a signal relay or a computer in response to a predetermined pattern of digital control pulses.

Even another object of this invention is to provide a railway signalling system for block signal control of railway track.

Other objects and advantages of the present invention will become apparent as the following description proceeds.

To the accomplishment of the foregoing and related ends, the invention, the, comprises the features hereinafter fully described and particularly pointed out in the claims, the following description and the annexed drawing setting forth in detail a certain illustrative embodiment of the invention, this being indicative, however, of but one of the various ways in which the principals of this invention may be employed.

DESCRIPTION OF THE PREFERRED EMBODIMENT

Figure 1:
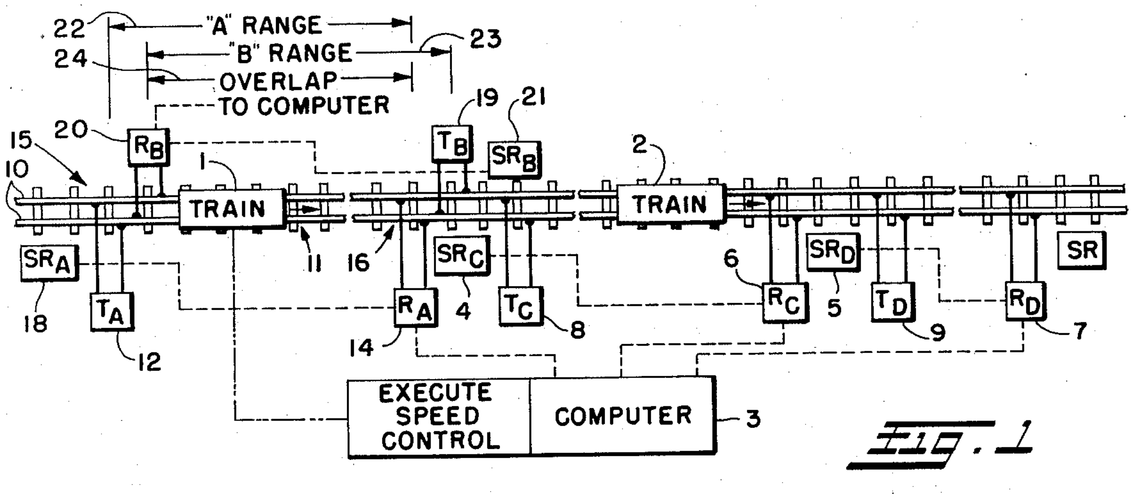
FIG. 1 is a schematic drawing partly in block diagram form showing a typical interconnection of the components of the system with a length of railroad track.

Referring now to the drawings wherein like reference numberals refer to like elements in the several figures, a plurality of track sections shown in FIG. 1 are connected for control of trains 1, 2 thereon by a computer 3. The computer 3 may be coupled, for example, to control the trains directly or to control a plurality of signal relays 4, 5 operating signal lights, signal flags, or the like in response to digital signal inputs from receivers 6, 7, which are coupled to the tracks to receive signals transmitted therein by transmitters 8, 9. Individual track sections are defined by the track extent between corresponding pairs of transmitters and receivers; and although only several transmitters and receivers are illustrated, their number may be increased depending upon the number of track sections to be controlled.

As shown, a signal transmitted by the transmitter 8 is shunted by the train 2. The receiver 6 senses the disappearance of such shunted signal and produces an output either directly or by way of the computer 3 to the signal relay 4, the latter indicating to train 1 the presence of train 2 ahead. If desired, the computer 3 may be coupled to control train 1 to assure that it does not enter the track section occupied by train 2. An overlapping block signal control system coupled to the tracks 10 at a particular track section 11 will be described in more detail below, and the principals of operation, of course, are applicable to the signal relays 4, 5, receivers 6, 7, and transmitters 8, 9 described above.

Referring now more specifically to the left-hand portion of FIG. 1, there is shown a length of railroad track 10 with which the apparatus of the invention is interconnected for monitoring traffic on the track and controlling the same. A dual protective or overlapping system for a track section 11, providing an area of overlap, is depicted in FIG. 1; however, for purposes of description only a single signalling circuit will be described in detail.

In FIG. 1 a first transmitter 12 and receiver 14 combination is shown connected at first 15 and second 16 locations along the track 10, such locations being at opposite ends of the track section 11. A relay 18 is indicated as associated with the first receiver 14, such relay being, for example, the conventional railway light or flag signal relay for operating indicator lights and the like. A second transmitter 19 and receiver 20 combination is interconnected with the same railroad tracks 10, also having a signal relay 21 associated therewith for similar indication purposes or interconnectable with the relay 18 of the first signalling circuit for production of a common indication at the track section location. The signals may be at one or both ends of the track section depending on traffic direction. As indicated by lines 22–24 in FIG. 1, the first transmitter-receiver combination produces a general range of sensitivity 22 through and at one side of the track section 11 while the second combination produces a range of sensitivity 23 through and at the opposite side of the track section location, an overlap area being indicated by line 24, protected by both signalling systems and available for indication purposes if desired by the aforementioned interconnection of the individual signalling relays 18, 21 or to the computer 3.

While two independent signal circuits are indicated in FIG. 1, it will be apparent that many different combinations of signalling circuits are possible with equipment of this type, for example, if multiple forms of signalling are desired on common railroad tracks or independent systems on parallel tracks, utilizing either independent or some common components from the adjacent systems. In the described embodiment of this invention each signaling circuit operates on a dual tone basis and plural circuits can be associated with common railroad tracks by the selection of sufficiently different pairs of tones so that no intermixing of signals occurs.

Figure 2:
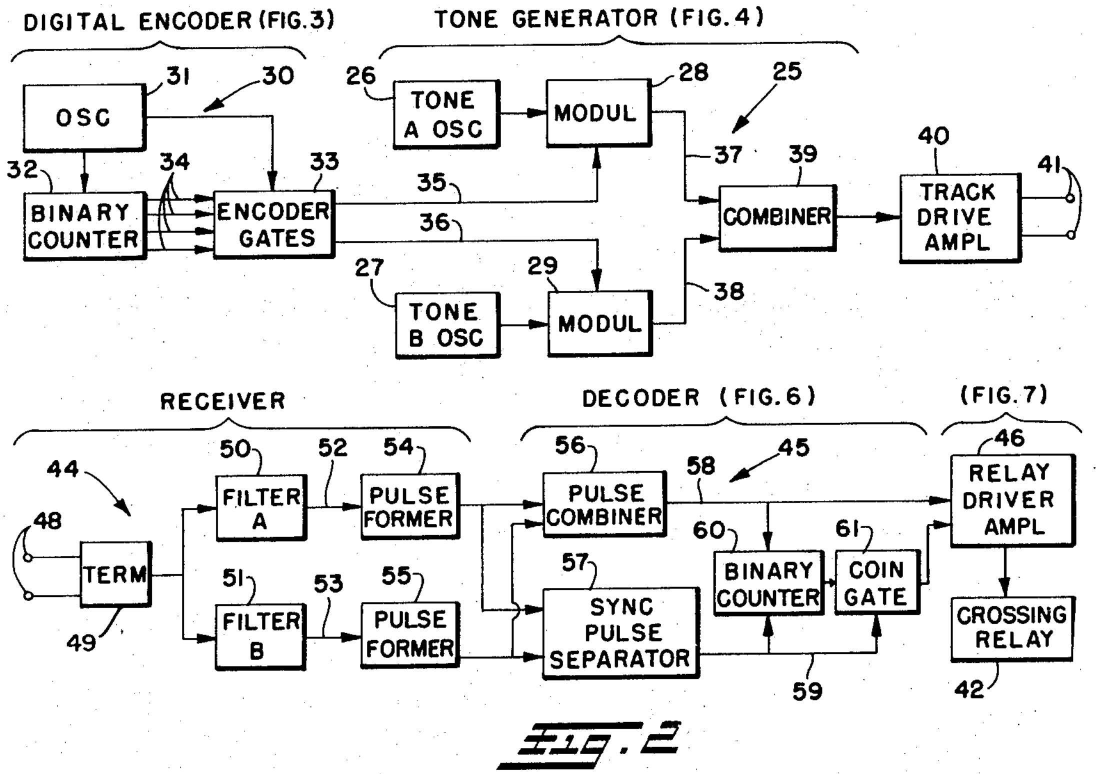
FIG. 2 is a schematic drawing in block diagram form of the overall logic scheme of the system.

Referrring now to FIG. 2, the mode of operation of the system can be determined from the block diagram of the major components, with references being provided for more detailed showings of portions of the system.

A tone generator 25, comprising first and second tone oscillators 26, 27, is shown for providing carrier signals for the digital pulses used in the system, the outputs of the oscillators 26, 27 being applied to modulator circuits 28, 29 respectively. A digital code of specific format is developed in an encoder 30 consisting of an independent oscillator 31 operating in the range of 12 Hz, providing outputs to a binary counter 32 and encoder gate array 33.

Figure 5:
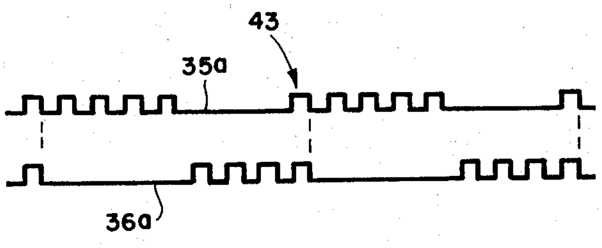
FIG. 5 is a graph of wave shapes occurring in the system, showing the specific recognition code pattern.

The binary counter 32 is a conventional flip-flop counter of the four stage type providing parallel output signal levels on lines 34, which combination of output levels changes with each input pulse from the oscillator 31. A specific recycled format of digital code is developed on the output lines 35, 36, the code utilized in this embodiment of the invention being in a 4-3-1 format, providing four pulses on line 35, three pulses on line 36 and a simultaneous pulse on lines 35 and 36, utilized as a sync pulse. Such format is shown in FIG. 5 as pulse trains 35*a*, 36*a*, with sync pulses at 43.

The digital pulses on lines 35, 36 are employed as keying pulses and are applied respectively to the modulators 28, 29 to provide digitally modulated audio signals on lines 37, 38 which are added together in a combiner circuit 39 and applied as a single input to the track drive amplifier 40. The track amplifier 40 is basically only a power amplifier for boosting the signal level to a suitable value to attain a sufficient island of sensitivity for protection of any particular railroad crossing. The output of the track amplifier 40 is isolated in a conventional manner by an output transformer, the secondary winding of which is indicated as connected to terminals 41, in turn coupled to the railroad tracks 10, at a location 15.

At the second location 16 closer to the end of the track section 11 remote from the transmitter is located the signal receiving portion of the system and the signal relay 42 for controlling indicator devices and the like. The signal receiving portion consists essentially of a selective audio receiver 44 for detecting the modualted carrier signals and converting same to a pulse format, a decoder section 45 for recognition of the specific code transmitted over the track circuit, and a relay driver amplifier 46 which acts as a further checking circuit, operating on a pulse energized basis.

At the input of the receiver 44, connection with the tracks 10 is made via input line 48, the signal being applied to a termination circuit 49 and in common to first and second filter units 50, 51 corresponding respectively to the carrier frequency signals of oscillators 26, 27. In this embodiment of the invention, both filter units 50, 51 are of the LC type, providing the selected tone band pass and possessing a recovery rate of approximately 20 Hz per second along with a high measure of selectivity so that a great number of different frequencies can be employed on the common track circuit if a more exotic control system is desired. It will be clear that other types of filter units 50, 51 may be employed other than the LC type, it being only necessary that high selectivity be available and that outputs be provided on lines 52, 53 representative of the modulated wave forms, for application to the pulse former sections 54, 55 of the receiver unit.

Although not shown or described in detail, as many different circuit arrangements can be employed in this portion of the system, the pulse former units 54, 55 typically comprise a Darlington amplifier for boosting of the signal level, a discriminator and envelope detector for demodulation and development of the DC pulses from the carrier signal, a further Darlington amplifier for signal level gain and an output amplifier for referencing the pulses to a zero voltage level for application to further circuitry.

In the decoder 45, the pulse trains from the pulse formers 54, 55 are applied in common to a pulse combiner circuit 56 and sync pulse separator circuit 57, the former providing a pulse train output on line 58 containing all of the transmitted digital information while the output of the sync pulse separator 57 provides pulses on line 59 only at the times of the commonly modulated carriers. The sync pulse on line 59, arriving at the end of the 4-3-1 code is utilized to reset a binary counter 60 and to apply a signal to a coincidence gate 61. The binary counter 60 senses the receipt of the correct number of pulses in the pulse train developed on line 58 and enables the coincidence gate 61 at a specific count so that if the sync pulse is timely received an output pulse will be developed for application to the relay driver amplifier 46. The combined pulse train is also supplied as one input to the the relay driver amplifier 46 and both inputs serve to directly develop operating potentials for the latter to provide an energizing voltage to the crossing relay 42 in order to provide the desired indication. In the event of malfunction anywhere in the system due to component failure or the prolonged receipt of additional pulses due to extraneously introduced noise and the like or in the event that the signal is shunted at the track circuit due to the presence of a train at the crossing location, the pulse type inputs to the relay driver amplifer 46 will be varied from their normal pattern and cause deenergization of the latter, together with an indication from the signalling unit actuated by the crossing relay 42.

Figure 3:
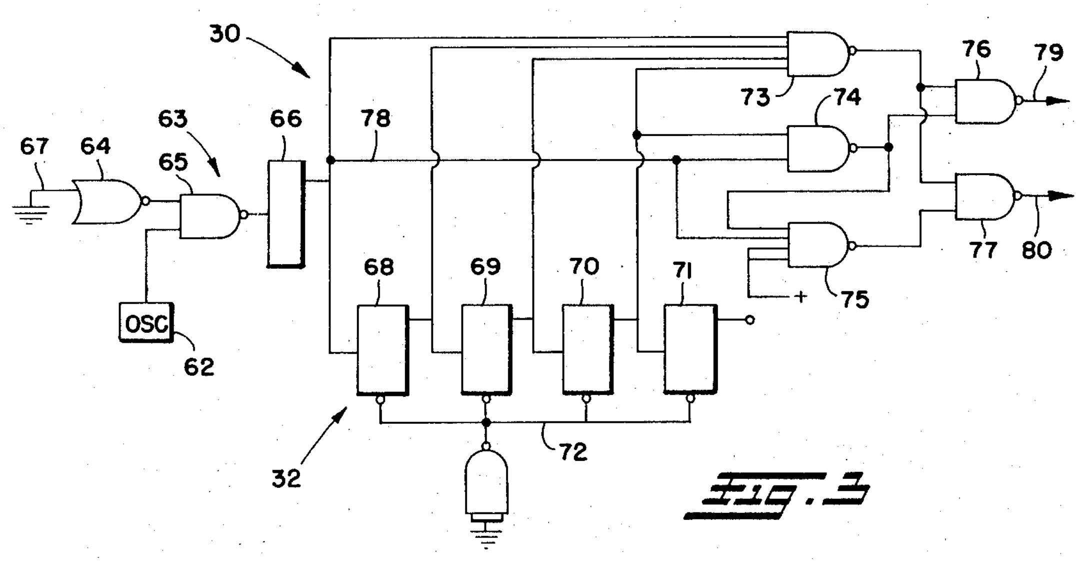
FIG. 3 is a schematic drawing in block diagram form of the logic scheme for the encoder portion of the invention.

While a general understanding of the operation of this system can be obtained from the foregoing, a detailed description of operation is provided of a preferred embodiment of the system including a specific code format and relay driver amplifier circuit 46 which is especially suited to the digital technique of handling information. Referring initially to the digital encoder 30 shown in FIG. 3, there is included a transistorized oscillator 62 which acts as a clock source for the remainder of the system, providing the desired timing of pulses therein and frequency of cycling to assure a reliable and yet responsive system. The oscillator 62 may be a conventional multivibrator circuit providing an output of 12 Hz for application to a monostable multivibrator 63 connected in Schmitt trigger mode for pulse shaping purposes to provide a train of output pulses of predetermined amplitude and width and at a frequency determined by the oscillator 62. The monostable circuit 63 is of the integrated circuit variety as are most of the components in this system and is indicated as a NOR 64, NAND 65 and bistable 66 circuit using conventional logic symbols as is well understood in this art. Such logic symbology will be used throughout the description of this invention and the diagram is set up for understanding using the positive logic description wherein a positive level symbolizes a one signal and a ground level symbolizes a zero signal. Only a single grounded input 67 is shown to the NOR gate 64 in the monostable circuit 63, utilizing a portion of the integrated circuit package to obtain a desired voltage level for application to the NAND gate 65.

The binary counter 32 comprises four bistable stages 68–71 interconnected in a conventional counting mode with only the first three stages 68–70 thereof required to accommodate the 4-3-1 code, but providing a capacity for other code formats. A biasing level is supplied at line 72, and parallel outputs are available from the stages 68–70 for enabling first, second and third NAND gates 73–75 in a predetermined pattern to provide digital signal levels at the output terminals. Fourth and fifth NAND gates 76, 77 are further employed for development of the desired pulse trains, receiving as one input the output of the first NAND gate 73 and as the second inputs respectively the outputs of the second and third NAND gates 74, 75. The output of the second NAND gate 74 is also coupled as an enabling input to the third NAND gate 75 and all three gates 73–75 receive in common the digital pulse train appearing on line 78.

Thus in operation, and using the convention that all high level inputs are required to provide a low output level from the NAND gates 73–77, the following mode of operation is obtained. At low counts of the binary counter 32 NAND gate 75 is enabled by way of the inversion of NAND gate 74, the latter receiving as an input the third stage level of the binary counter 32 so that a first group of pulses are produced at the output of gate 77. When the binary counter 32 reaches the fourth count to change the state of stage 70, the conditions of NAND gates 74 and 75 are reversed so that a further group of pulses are produced at the output of NAND gate 76. The last count of the binary counter 32 is recognized in NAND gate 73 by virtue of the plural input connections from stages 68–70 of the binary counter 32 so that NAND gates 76 and 77 are enabled simultaneously to produce simultaneous synchronizing pulses at the respective outputs 79, 80 thereof for coupling, for example, by lines 35, 36 shown in FIG. 2 to the respective modulators 28, 29.

The binary counter 32 cyclically repeats this conditioning pattern of the NAND gates 73–77, being stepped at the rate of oscillator 62 to produce repetitive pulse groups at intervals of two thirds of a second in the preferred embodiment of the invention. Any pattern of pulses may be selected for modulation purposes, the 4-3-1 code, however, providing sufficient distinction so as to discriminate against noise pulses and the like, while requiring only a minimum of components and an easily recognized code for testing, maintenance procedures and the like. It will be clear also that if noise signals are encountered in this portion of the apparatus and even if the same code pattern is generated, it will be at an inconsistent rate which will be recognized in the decoder 45 and relay driver 46 circuitry.

Figure 4:
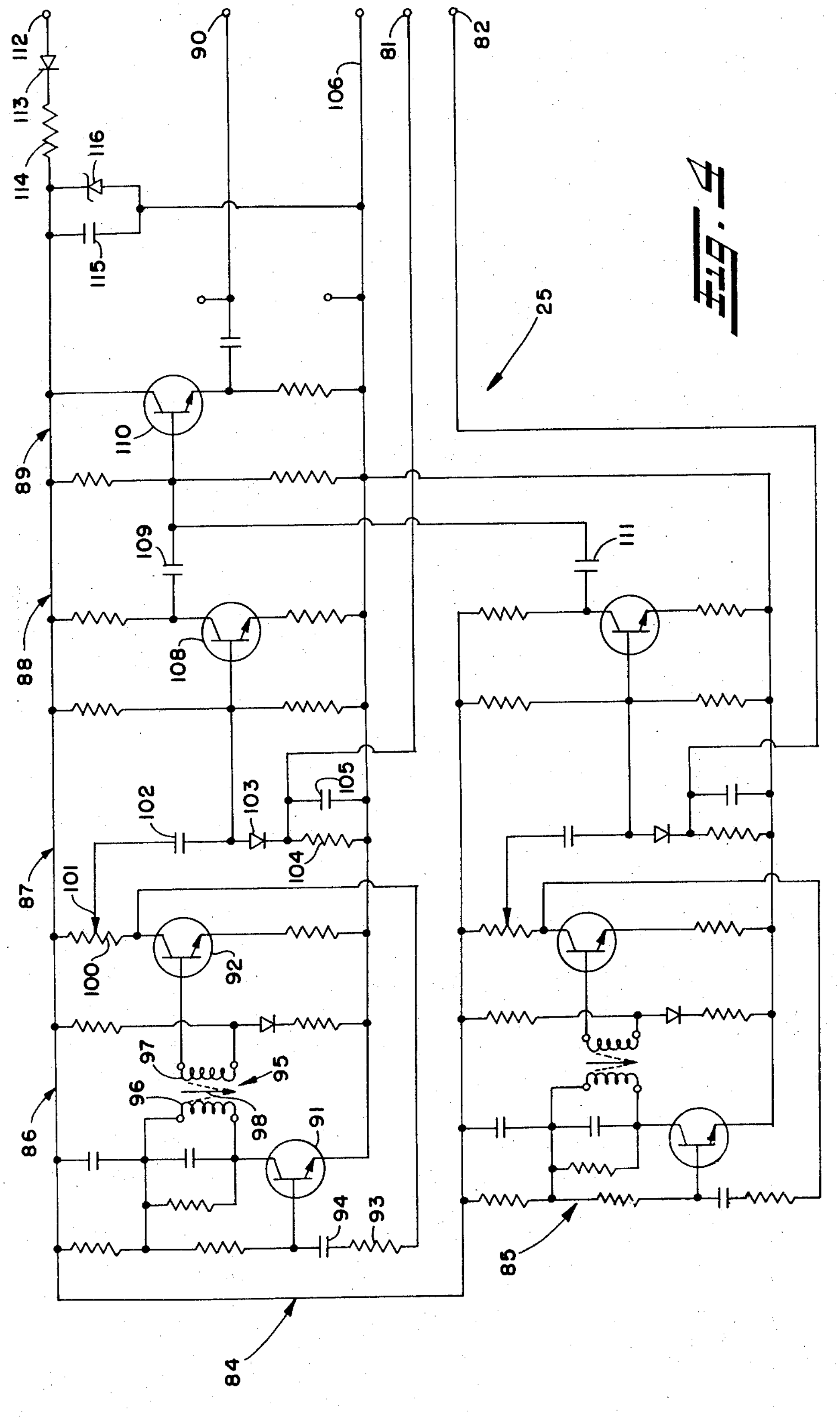
FIG. 4 is an electrical circuit schematic of the tone generator and modulator portion of the invention.

Referring now to FIG. 4 schematic circuit diagram of the tone generator portion 25 of the apparatus there is shown a pair of input terminals 81, 82 adapted for direct connection to the output terminals 79, 80 of the digital encoder 30 upon which the keying digital signals appear. The tone generator 25 is a dual channel 84, 85 unit providing first and second audio frequency signals for use as carrier signals for transmitting the digital code over the railroad track 10. The tone channels 84, 85 are similar, except for frequency determining components and channel 84 comprises an oscillator section 86, a modulator section 87, and an output amplifier 88 and the outputs of both channels 84,85 are mixed or combined in a common amplifier stage 89 for production of a combined output signal at terminal 90.

For purposes of description only channel 84 of the tone generator 25 will be described in detail and it will be apparent that a similar operation obtains in the second channel 85. First and second transistors 91, 92 form an oscillator circuit with feedback from transistor 92 to the base circuit of transistor 91 being established through a series circuit consisting of resistor 93 and capacitor 94. Precise frequency stabilization for the oscillator 86 is provided by an extremely high Q mechanical reed filter 95 comprising an input winding 96 connected in the collector path of transistor 91 and an output winding 97 connected in the base path of transistor 92, coupling between the two windings 96, 97 being effected at a precise frequency of resonance as determined by the natural frequency of oscillation of a vibrating reed 98 disposed therebetween. While other frequency standards are suitable for use with the apparatus of this invention, this particular form of oscillator 86 provides a high degree of frequency stability, easily altered by the substitution of different reed filters and is of extremely high reliability. A filter especially suited for this application is the model RF-20 plug-in type filter manufactured by The Bramco Controls Division of Ledex, Inc. Typical frequencies of operation for the oscillator 86 may range from 313 Hz to 2,706 Hz with at least twenty distinguishable frequencies in this range, and two such frequencies may be selected for the first and second channels 84, 85 of the tone generator 25.

The output signal of the oscillator 86 is developed across a potentiometer 100 in the collector path of transistor 92, the adjustable slider 101 being connected by way of a series capacitor 102 to the modulating or keying circuit 87 comprising the series diode 103 and resistor 104 with capacitor 105 in parallel across the latter. Normally the diode 103 is forward biased by virtue of the resistor 104 connection to ground 106 so that no input signal is applied to the base circuit of transistor 108, connected in common emitter amplifier configuration. The digital modulating pulses from terminal 81 swing between a ground and plus two volt level, the latter condition back-biasing the diode 103 to allow the output of the oscillator 86 to be coupled to the base circuit of transistor 108. The time constant of the resistor 104 and capacitor 105 circuit is sufficiently short to follow the modulating pulses and maintains the configuration of same by preventing over-shoot and the like.

The thus modulated carrier signal is coupled by way of capacitor 109 to the base electrode of transistor 110, connected as an emitter follower and acting as the combiner stage 89 for superimposing the two carrier signals in a common output. The output of the second channel 85 of the tone generator 25 is similarly coupled to the base electrode of transistor 110 by way of capacitor 111 and the resultant output of the circuit at terminal 90 is a train of pulses of two different carrier frequencies, modulated in a specific code pattern, i.e., the 4-3-1 pattern, including the common synchronizing pulse which includes components of both carrier frequencies. A common power supply for the tone generator channels 84, 85 is provided from terminal 112 connected to a source of high DC voltage, delivering power through a series diode 113 and voltage dropping resistor 114 to a filter capacitor 115 and voltage regulating zener diode 116.

The output terminal 90 of the tone generator 25 is coupled to the track drive amplifier 40, not detailed for purposes of this description, but providing essentially power amplification for the signal and suitable coupling to the railroad tracks 10. A three stage transistor amplifier may be utilized for this purpose and preferably the output is coupled by way of a transformer having approximately a 2 Ohm secondary impedance and a series capacitor connection to the two output terminals 41 which in turn are directly connected to the railroad tracks 10, utilizing any required railroad conventions such as lightning arrestors, voltage protection devices and the like. Further the track drive amplifier 40 may include a gating connection in which the circuit may be completely disabled for test or maintenance purposes.

Similarly the receiver circuit 44 is not detailed for purposes of this description, except as generally set forth previously. Essentially, however, first and second filters 50, 51, preferably of the LC type receive the modulated signal in common and separate the transmitted signal into two carrier channels. Each channel includes suitable voltage amplification devices, a discriminator circuit and envelope detector together with a zero level referencing circuit, thereby providing the demodualting function and providing the pulse outputs on first and second lines.

Figure 6:
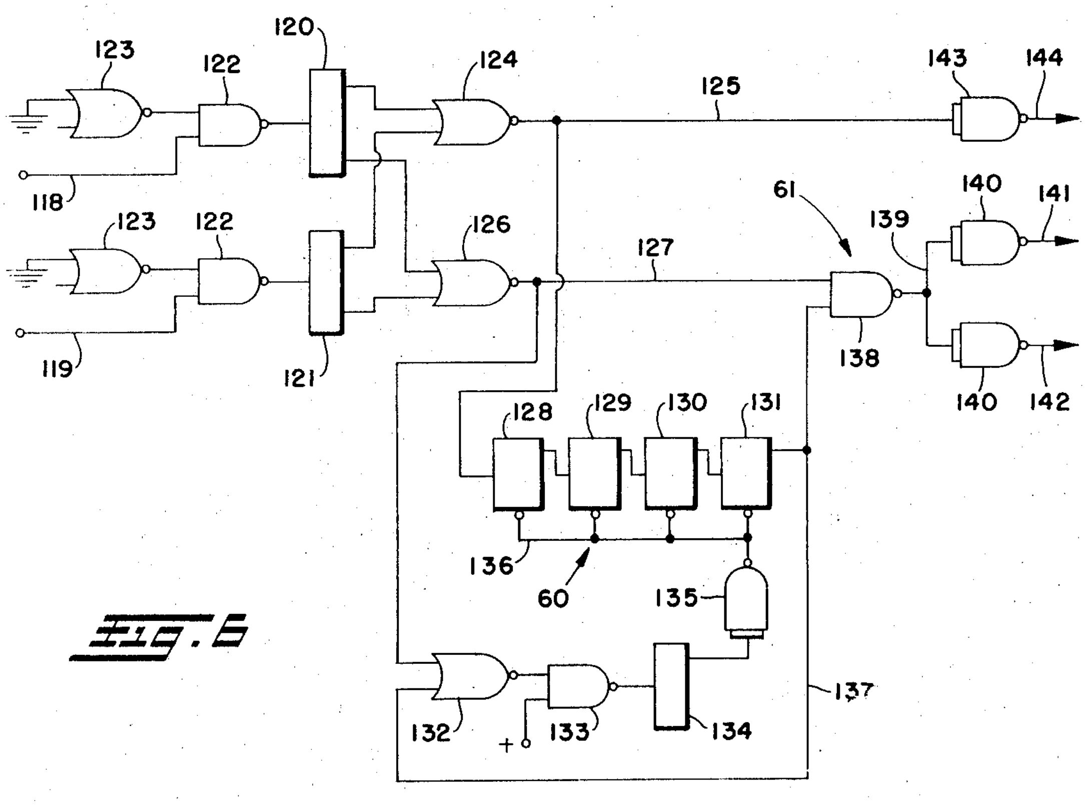
FIG. 6 is a schematic drawing in block diagram form of the logic system for the decoder portion of the invention.

In the decoder 45 shown in logic diagram form in FIG. 6, such first and second lines 118, 119 are applied to first and second flip-flops 120, 121 by way of NAND gates 122 biased in turn by grounded input NOR gates 123 for pulse shaping purposes, utilizing available components on selected integrated circuit chips. The true outputs of the flip-flops 120, 121 are connected to a first NOR gate 124 providing the function of pulse combination, thereby providing a continuous train of pulses on output line 125 and the inverted outputs of the flip-flops 120, 121 are applied to a second NOR gate 126 for sync pulse separation purposes, providing only the sync pulse on the output line 127.

The output of the pulse combiner NOR gate 124 is applied to the toggle input of the binary counter 60 consisting of four JK flip-flop stages 128-131 to provide a repetitive count of the pulse transmitted through the system. The sync pulse output on line 127 of the pulse separator NOR gate 126 is applied to a monostable circuit consisting of NOR gate 132, NAND gate 133 and flip-flop 134 which by way of amplifying NAND gate 135 produces a cancellation pulse on line 136 for resetting of the binary counter 60 in preparation for receipt of the next cycle of transmitted pulses. Resetting of the binary counter 60 is also effected by the condition of the last stage 131 on the counter, being connected by line 137 as one input to the NOR gate 132 in the monostable circuit.

The main purpose of the binary counter 60 is to decode the received pulses and such function is preformed in a coincidence circuit 61, consisting of NAND gate 138, enabled at one input by the connection of line 137 to the fourth stage 131 of the binary counter 60, and at the other input by the sync pulse on line 127 to produce a sync pulse output on line 139 at a rate of approximately 2/3 Hz as determined by the oscillator 62 in the digital encoder section 30. The sync pulse is applied to a pair of NAND gates 140 for amplification purposes, providing common outputs on lines 141, 142 for application to the relay driver amplifer 46. The continuous pulse signal on line 125 is similarly applied to an amplifying NAND gate 143 for producing production of an output signal on line 144 consisting of a train of pulses occurring at the 12 Hz rate, also for application to the relay driver amplifier 46.

It will be seen then that all components of the system must be operative in order to produce the continuous pulse train at the output of the NAND gate 143 and similarly that the pulses must be received in the specific code pattern to enable the coincidence gate 138 for reception of the sync pulse at the proper time relative to the remainder of the code pattern. If extraneous noise pulses are received and intermingled with the code pulses, the binary counter 60 will have completed its count and have been reset via line 137 without the receipt of a sync pulse at the appropriate time or if some pulses are lost in the transmission, the binary counter 60 will not have reached a sufficient count to enable the coincidence gate 138. Similarly noise pulses common to both input lines 118, 119 will cause a common triggering of the flip-flops 120, 121 and production of a sync pulse on line 127 which will reset the binary counter 60 by way of the monostable circuit before receipt of the desired sync pulse. It will be clear that even though the binary counter 60 is disrupted in any one cycle, the receipt of a sync pulse on line 127 will reset same in preparation for the next cycle of digital signals so that synchronization is readily maintained. In the presence of a shunting medium at the tracks 10, however, such as a train which is desired to be detected, the discontinuation of pulses will recur over a great number of cycles and it will be pointed out that the specific configuration of the relay amplifier circuit 46 is designed to distinguish between the intermittent or random occurrence of noise pulses, discontinuities and the like and the continuous disruption due to the presence of a train or continued inoperability of the system.

Figure 7:
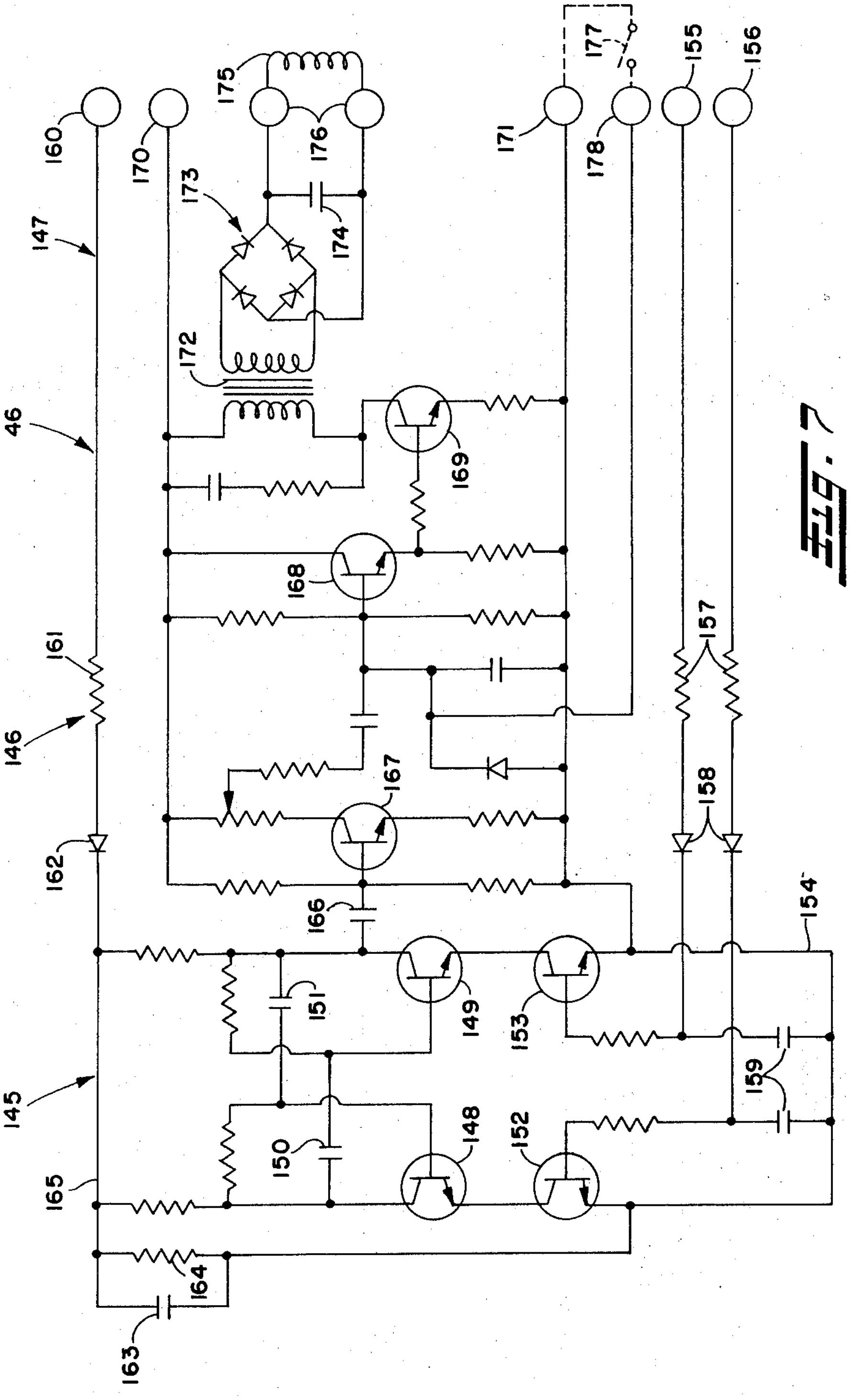
FIG. 7 is an electrical schematic drawing of the signal relay driver amplifier.

The relay driver amplifier 46 is shown in schematic circuit form in FIG. 7 and comprises generally an enabled oscillator circuit 145, power amplifier section 146 and relay energization circuit 147. First and second transistors 148, 149 are interconnected by capacitors 150, 151 to form a multi-vibrator circuit and a pair of further transistors 152, 153 are connected in the emitter leads thereof for gating the oscillator into conduction by the production of a suitable current path to ground 154. The synchronizing pulses on lines 141, 142 of the decoder 45 are applied at first and second input terminals 155, 156 respectively, and by way of series resistors 157 and diodes 158 to the base circuits of the gate transistors 152, 153 which further include the shunt capacitors 159. The discharge time of the capacitors 159 is on the order of 1 ½ seconds so that synchronizing pulses received at the rate of approximately 2/3 Hz will maintain the base bias of the gate transistors 152, 153 at a suitable level to allow oscillation of the main transistors 148, 149. In the event of loss of sync pulses at either of terminals 155, 156 for a continued interval of time, other than the random loss of one or two pulses in sequence, the base electrodes will be drawn to ground potential and the gate transistors 152, 153 cut-off to prevent oscillation of transistors 148, 149.

Further, the oscillator circuit 145 receives operating potential directly from the continuous pulse train applied at input terminal 160, connected to line 144 of the decoder 45, which pulses are applied through resistor 161 and diode 162 to filter capacitor 163 and shunt resistor 164 to supply operating potential on line 165. The time constant of the resistor 164 and capacitor 163 is on the order of 4 seconds to again allow for random loss of pulses but to be sufficiently responsive to a continuous loss of pulses due to the presence of a train or inoperability of the circuit to disable the oscillator 145.

The output of the oscillator 145 is realized at the collector electrode of transistor 149 and is coupled by way of capacitor 166 to a three stage amplifier 146 comprising transistors 167–169. Regulated DC voltage is applied to the remainder of the circuit by way of terminal 170 with reference to ground potential at terminal 171 so that only the oscillator circuit 145 obtains power from the pulse train and synchronizing pulses received from the decoder circuitry 45.

The third transistor 169 in the AC coupled amplifier 146 includes the primary winding of an output transformer 172 in the collector path thereof and the oscillatory signal is rectified in a bridge rectifier 173 and filtered by a shunt capacitor 174 to provide a source of DC voltage for the crossing relay coil 175 shown connected to terminals 176. The fail-safe operation of the system may be readily visualized in that it is necessary for signals to be realized throughout the system to supply energizing power for the signal relay coil 175 and the loss of signal due either to component failure anywhere throughout the system or shunting of the transmitted signal by means of a train in the vicinity of the track section location 11 will disrupt the energizing voltage for the relay coil 175 and cause automatic drop out of the signal relay 42, a condition which is signalled by the closure of appropriate contacts or the like to provide a visual indication, lowering of the signal flag or any other desired signal. A lock out connection is also included in the relay driver amplifier circuit 46 for maintenance purposes, consisting of an externally connected switch 177 for shunting terminals 171, 178, causing grounding of the base electrode of transistor 168, thereby presenting a cut-off condition.

Referring again to FIG. 1, it will be recalled that the first transmitter 12 and receiver 14 combination employed two different tone signals as carrier signals in the system and the second transmitter 19 and receiver 20 combination can be utilized at the same crossing location 11 and on common tracks 10 by the selection of different carrier signals so that no interaction between the system occurs. It will be appreciated also that any number of signalling combinations may be employed on common tracks to effect operation of signal devices or the computer 3 for control of one or more track sections or that, for example, common transmitter units may be employed on parallel track circuits while individual receiver units are connected as shown in FIG. 1. Further the system is perfectly compatible with other types of signalling systems which might be employed on the same tracks, for example the DC signalling circuits or even the audio frequency type circuits so long as sufficient discrimination is provided between the selected frequencies of operation.

The embodiments of the invention in which a certain property or privilege is claimed are defined as follows:

1. Railway signalling apparatus comprising means for developing a train of digital signals of specific character at a first location, means for coupling said digital signals into the railroad track, receiver means at a second location along the track for detecting said digital signals, decoder means for sensing the specific character of such digital signals and for providing a control signal indicative thereof, means responsive to such control signal for providing an indication thereof, said digital signal developing means comprising a dual frequency signal generator for providing a train of pulse of at least two frequencies, and said receiver means being operative to sense such signals for production of a digital signal for application to said decoder means.

2. Apparatus as set forth in claim 1 wherein said digital signal developing means comprises an independent oscillator for determining the rate of occurrence of pulses in the digital pulse train, a binary counter coupled to said oscillator for providing plural gating signals, and a gate array enabled by said gating signals and said oscillator, said gate array having a pair of output terminals providing pulse trains thereon.

3. Apparatus as set forth in claim 2, wherein said digital signal developing means further comprises switching means operative in response to the pulse trains on said pair of output terminals and said dual frequency generator to provide two digitally encoded and synchronized trains of pulses.

4. Apparatus as set forth in claim 3 further including means for combining said pulse trains for application to the track circuit, and a power amplifier for boosting such signals, said power amplifier having a transformer coupled output, the secondary winding beng a relatively low impendance winding adapted for connection to said tracks.

5. Apparatus as set forth in claim 1 wherein said receiver means comprises first and second filters having pass bands corresponding respectively to the two frequencies of said signal generator, said filters being coupled in common to said tracks, and further including means for demodulating the outputs of said filters to provide pulse signals for control purposes.

6. Apparatus as set forth in claim 5 wherein said demodulating means comprises plural amplifier stages for boosting the signal level, a discriminator and envelope detector circuit for producing DC pulses, and means for referencing the pulses to a zero voltage level.

7. Apparatus as set forth in claim 5 wherein said decoder means comprises a binary counter, means for combining the digital signals for application to said binary counter, and means for detecting the receipt of a sync pulse in a predetermined relation with respect to said digital signals, said detecting means being coupled to said binary counter.

8. Apparatus as set forth in claim 7 wherein said detecting means comrpises a coincidence circuit enabled by said binary counter and adapted for transmission of a sync pulse at a specific state of said counter.

9. A system for protection of railroad track sections and the like, comprising:

a. first and second transmitters located on opposite sides of a railway track section and coupled to the railroad tracks, each said transmitter comprising a dual signal generator for producing an output signal having at least two frequencies, b. first and second receivers coupled to said track section on opposite sides of the track section from the respective transmitters to provide a signal overlap in the region of the track section, each of said receivers comprising means for accepting a single pair of said frequencies to be responsive to a single transmitter, c. relay means energized by said first and second receivers to provide a signal indication, whereby said transmitters have different frequencies of operation to avoid crosstalk and are dadapted to produce digitally coded signals distinctive of each said transmitter.

10. The system as set forth in claim 9 wherein said first and second receivers comprise digital signal decoders for energizing said relay means only in response to a predetermined digital code received from the respective transmitters.

11. The system as set forth in claim 10 wherein said first and second receivers are interconnected to provide a common indication for the track section, only when a shunting medium is detected within the track section.

12. A system for protection of railroad track sections and the like, comprising first and second transmitters located on opposite sides of a railway crossing and coupled to the railroad tracks, first and second receivers coupled to said tracks more closely adjacent the crossing from the respective transmitters to provide a signal overlap in the region of the crossing, relay means energized by said first and second receivers to provide a crossing indication, said transmitters having different frequencies of operation to avoid crosstalk and adapted to produce digitally coded signals distinctive of each said transmitter, said first and second receivers comprising digital signal decoders for energizing said relay means only in response to a predetermined digital code received from the respective transmitters, said first and second receivers being interconnected to provide a common indication for the crossing, only when a shunting medium is detected within the crossing, each said first and second transmitter comprising dual signal generators of differing frequency, and said receivers comprising means for accepting a single pair of said frequencies to be responsive to a single transmitter.

* * * * *